(12) United States Patent
Takahana

(10) Patent No.: US 7,717,488 B2
(45) Date of Patent: May 18, 2010

(54) VEHICLE SEAT

(75) Inventor: Mitsuyoshi Takahana, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 564 days.

(21) Appl. No.: 11/604,765

(22) Filed: Nov. 28, 2006

(65) Prior Publication Data

US 2008/0012380 A1 Jan. 17, 2008

(30) Foreign Application Priority Data

Dec. 19, 2005 (JP) .............................. 2005-364711

(51) Int. Cl.
*B60N 2/04* (2006.01)
*B60N 2/02* (2006.01)

(52) U.S. Cl. ................. 296/65.03; 296/65.01; 297/336; 248/503.1

(58) Field of Classification Search .............. 296/65.03, 296/64, 63, 69, 65.01; 297/344.15, 239, 297/311, 353, 312, 331, 335, 336, 378.13; 248/419, 503.1

See application file for complete search history.

(56) References Cited

U.S. PATENT DOCUMENTS 5,947,562 A * 9/1999 Christofferson et al. ..................... 297/440.22

| | | | | |
|---|---|---|---|---|
| 6,161,891 A * | 12/2000 | Blakesley | ................ | 296/65.01 |
| 6,361,098 B1 * | 3/2002 | Pesta et al. | ................ | 296/65.03 |
| 6,695,378 B2 * | 2/2004 | Hanagan | .................. | 296/65.01 |
| 2004/0075292 A1 * | 4/2004 | Rausch et al. | ............ | 296/65.03 |
| 2004/0104590 A1 * | 6/2004 | Kikuchi et al. | ........... | 296/65.03 |
| 2004/0183328 A1 * | 9/2004 | Daniel | .................... | 296/65.03 |

FOREIGN PATENT DOCUMENTS

| FR | 2832105 | 5/2003 |
|---|---|---|
| JP | 5-1347 | 1/1993 |
| JP | 11-034709 | 2/1999 |

* cited by examiner

*Primary Examiner*—Patricia L Engle
*Assistant Examiner*—SunSurraye Westbrook
(74) *Attorney, Agent, or Firm*—Global IP Counselors, LLP

(57) ABSTRACT

A vehicle seat of a vehicle is basically provided with a seat cushion, an annular frame, a hook or striking member and a vehicle body engagement element. The seat cushion is disposed within the vehicle. The annular frame disposed within the seat cushion. The striking member is attached to the annular frame to attach the vehicle seat to the vehicle body. The vehicle body engagement element is attached to the annular frame so as to serve as a load transferring point at which the vehicle body engagement element transfers a bending load of the annular frame to the vehicle body as the vehicle seat is being initially lifted.

20 Claims, 10 Drawing Sheets

VEHICLE SEAT

CROSS-REFERENCE TO RELATED APPLICATIONS

This application claims priority to Japanese Patent Application No. 2005-364711, filed on Dec. 19, 2005. The entire disclosure of Japanese Patent Application No. 2005-364711 is hereby incorporated herein by reference.

BACKGROUND OF THE INVENTION

1. Field of the Invention

The present invention generally relates to vehicle seats. More specifically, the present invention relates to a vehicle seat configured to prevent its frame from bending when being moved from an installed position to an access position (e.g., pop-up or release position).

2. Background Information

A vehicle seat is generally fixed to a vehicle body. However, sometimes, the vehicle seat needs to be removed from the vehicle for various reasons such as maintenance or repair. In this regard, the vehicle seat may include hooks, which can be coupled to a latching device installed to the vehicle body. For example, Japanese Utility Model Laid-Open Application No. (Hei) 05-001347 discloses a seat mounting arrangement has a seat cushion with a metal frame that is releasably coupled to the vehicle body by a pair of rear latches located at a rear end of the frame and a pair of front latches located at a front end of the frame. The rear end of the wire frame is coupled to a wire frame of a seat back by hooks so that the seat can be removed. The seat cushion can be removed by applying a vertical lifting force to release the engagement force of one pair of the latches while the other pair of latches acts as a pivoting structure. Another example of a seat mounting arrangement is disclosed in Japanese Patent Laid-Open Application No. (Hei) 11-34709. In this publication, the seat mounting arrangement has a seat cushion with a wire frame that is releasably coupled to the vehicle body by a pair of grommets at a front end of the wire frame. The rear end of the wire frame is coupled to a wire frame of a seat back by hooks so that the seat can be removed.

In view of the above, it will be apparent to those skilled in the art from this disclosure that there exists a need for an improved vehicle seat. This invention addresses this need in the art as well as other needs, which will become apparent to those skilled in the art from this disclosure.

SUMMARY OF THE INVENTION

It has been discovered that in conventional vehicle seats, such as the ones mentioned in Japanese Utility Model Laid-Open Application No. (Hei) 05-001347, discussed above, its wire frame tends to bend when subjected to a lifting force for releasing the vehicle seat from the latching device of the vehicle.

One object of the present invention is to provide a vehicle seat configured to prevent its frame from bending during removal or popping up the seat cushion from a normal installed position to an access position in which the seat cushion can be removed or the area under the seat can be accessed without complete removal of the seat cushion from the vehicle body.

In accordance with one aspect of the present invention, a vehicle seat is provided that basically comprises a seat cushion, an annular frame, a striking member and a vehicle body engagement element. The seat cushion has an upper seat surface. The annular frame is disposed within the seat cushion to maintain a shape of the seat cushion. The striking member extends from the annular frame in an opposing direction to the upper seat surface of the seat cushion to releasably engage a latching device mounted to a vehicle body. The vehicle body engagement element is attached to the annular frame with the vehicle body engagement element being located extending away from the striking member to serve as a load transferring point at which the vehicle body engagement element transfers a bending load of the annular frame to the vehicle body as the vehicle seat is being initially lifted.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1A:
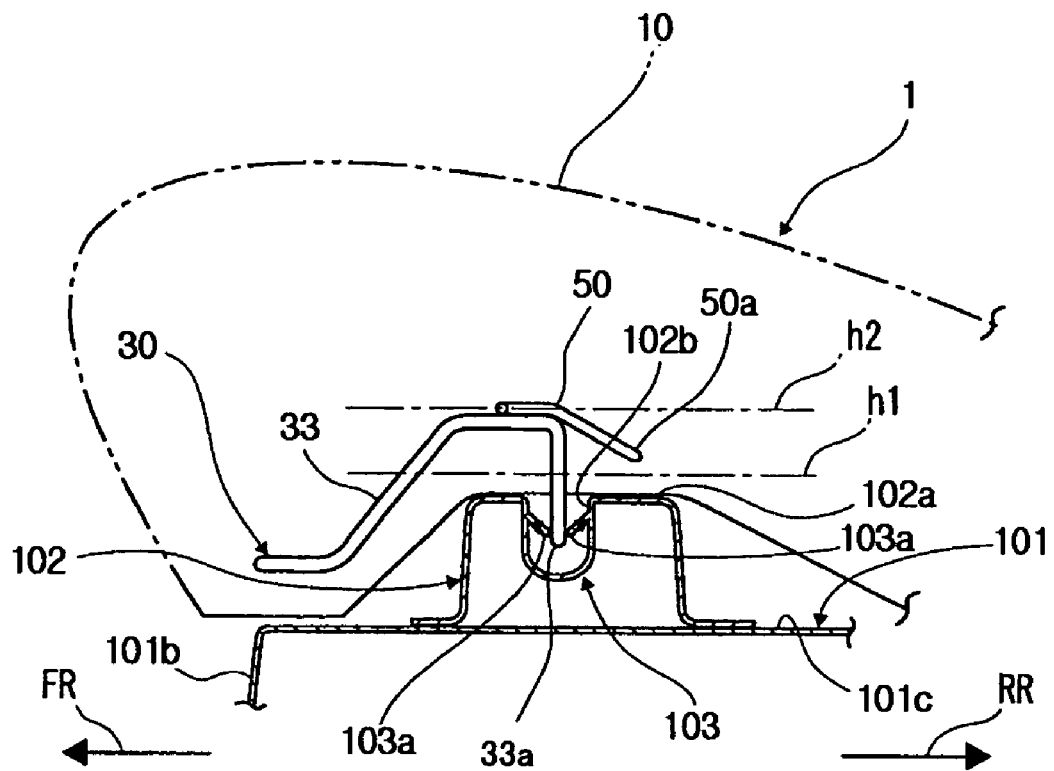
FIG. 1(a) is a simplified schematic side view of a vehicle seat constructed in accordance with a first embodiment of the present invention.
Figure 1B:
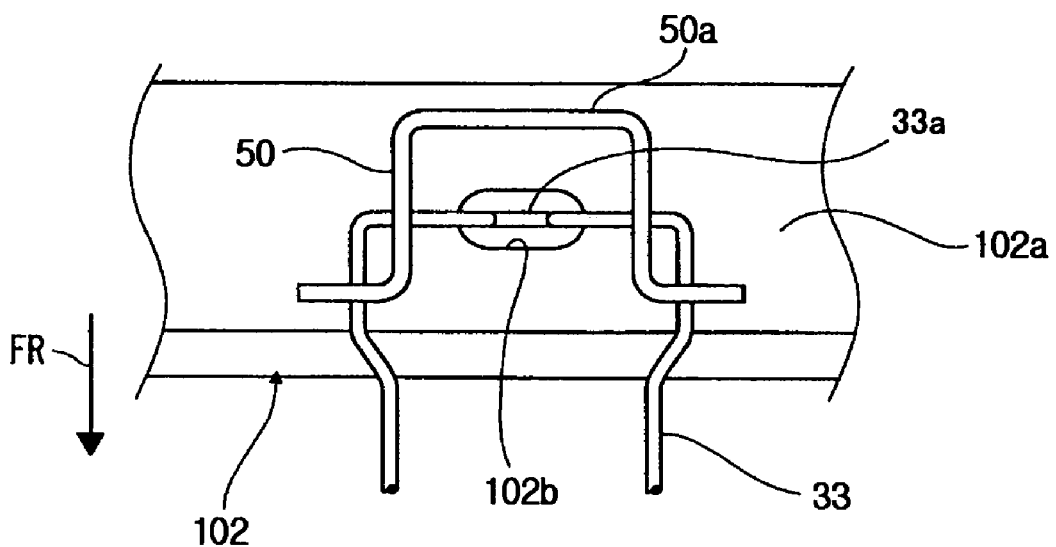
FIG. 1(b) is a partial top plan view of selected portions of the vehicle seat shown in FIG. 1(a)

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1(a) to 3, a vehicle seat 1 is illustrated in accordance with a first embodiment of the present invention. The vehicle seat 1 basically includes a seat cushion 10 having a resilient pad 20 and a seat cushion frame 30. The seat cushion frame 30 made of steel wires is installed to a seat cushion 10 of the vehicle seat 100. The seat cushion frame 30 supports the resilient pad 20 in order to maintain the shape of the seat cushion 10.

Figure 2:
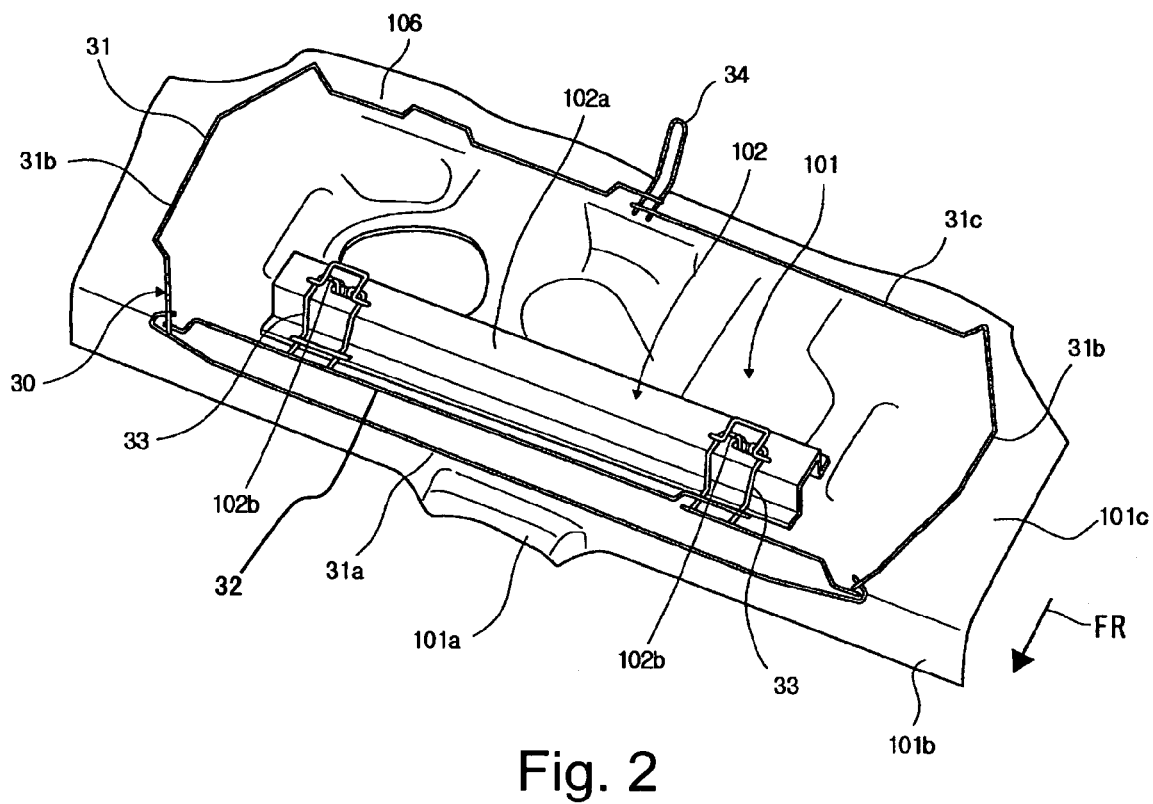
FIG. 2 is a perspective view of a seat cushion frame and a rear floor panel of the vehicle seat shown in FIG. 1(a)

As seen in FIG. 2, the seat cushion frame 30 includes a main frame 31, a sub-frame 32 bridging the main frame 31 in the lateral direction of the vehicle, a pair of front hooks or striking members 33 fixed to the sub-frame 32 and a centrally located rear hook or striking member 34 fixed to the main frame 31. The front hooks or striking members 33 are each provided with a vehicle body engagement element 50 that contacts the vehicle body for producing a releasing force to move the mounting end 33a upwardly when the lifting force is applied to the seat cushion frame 30. The vehicle body engagement elements 50 are disposed within the seat cushion 10 so as to be closer to the vehicle body than the upper seat surface of the seat cushion 10. The vehicle body engagement elements 50 are wire members that have a substantially uniform cross-sectional profile. In this embodiment, the vehicle body engagement elements 50 are separate parts that are fixed (welded) to the front hooks 33 of the annular frame 30, respectively.

Each hook 33 is attached to the frame 30 for securing the seat cushion 10 to the vehicle body in a releasable manner. Also, the hook 33 has a mounting end 33a that is coupled to a latching device 103 that is installed to the vehicle body of the vehicle in order to secure the seat cushion 10 to the vehicle body. The vehicle seat 1 of the first embodiment is installed on a rear floor panel 101 of the vehicle body as shown in FIG. 1(a) and can serve as either a rear or front passenger seat.

When a lifting force for lifting an end of the seat cushion 10 is applied to the hooks 33 and exceeds a coupling force of the latching devices 103, the mounting end 33a is released from the latching devices 103. This allows the seat cushion 10 to be removed from the vehicle body. In particular, the vehicle body engagement elements 50 come into contact with the vehicle body so as to serve as a load transferring point at which the vehicle body engagement elements 50 transfers a bending load of the annular seat cushion frame 30 to the vehicle body as the seat cushion 10 is being initially lifted. Thus, the vehicle body engagement elements 50 serve as a pivot portion of the annular seat cushion frame 30 for producing a force to move the mounting ends 33a upwardly when the lifting force is applied to the seat cushion frame 30.

As shown in FIG. 2, the rear floor panel 101 includes a front wall portion 101b, which extends upwardly at the rear end of a floor tunnel 101a. The rear floor panel 101 also includes a top wall portion 101c that extends continuously from a top end of the front wall portion 101b toward the rear of the vehicle (arrow FR indicates the front direction of the vehicle, whereas arrow RR indicates the rear direction of the vehicle). In addition, a support floor 102 having a hat-shaped cross-section, which is fixed to the rear floor panel 101 (via welding and the like), extends in the lateral direction of the vehicle at the front of the top wall portion 101c.

Both ends of the top surface 102a of the support floor 102, which extend in the lateral direction of the vehicle, have insertion-holes 102a and 102b. The latching devices 103, which are used as coupling devices, are installed underneath the insertion-holes 102a and 102b.

As seen in FIG. 2, the main frame 31 has a substantially rectangular shape and is formed with a front frame section 31a, a pair of side frame sections 31b and a rear frame section 31c, which are disposed in the proximity of the outer periphery of the seat cushion 10. The sections of the seat cushion frame 30 are configured and arranged to support the pad 20, and thus, maintain the shape of the seat cushion 10.

The front hooks 33 have a substantially U-shape and extend from both sides of the side frame 32 in the lateral direction of the vehicle toward the rear of the vehicle or are inclined upward.

Figure 3:
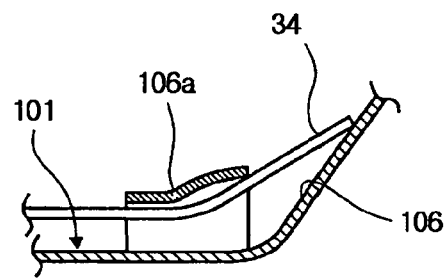
FIG. 3 is a partial cross-sectional view of the vehicle seat shown in FIG. 1(a)

The rear hook 34 has a substantially U-shape and extends from about the center of the rear frame 31c in the lateral direction of the vehicle towards the rear of the vehicle or are inclined upwards. Further, as shown in FIG. 3, the rear hook 34 is coupled to a coupling bracket 106a provided at a panel 106, which extends from the rear floor panel 101. In particular, the rear hook 34 is inserted into the coupling bracket 106a while the front end of the seat cushion 10 is lifted upwardly. In addition, the rear hook 34 and the coupling bracket 106a are coupled to each other when the seat cushion 10 is slid rearward. Then, the seat cushion 10 is coupled to the rear floor panel 101 by lowering the front end of the seat cushion 10. When in such a coupled state, the two parts 34 and 106a are coupled to each other in the longitudinal and lateral directions of the vehicle.

As shown in FIGS. 1(a) and 11(b), the front hook 33 includes a mounting end 33a having a substantially U-shape that extends perpendicularly downward. The mounting end 33a is integrally formed to the rear end of the front hook 33. The mounting end 33 is inserted into the insertion-hole 102b of the support floor 102 and is coupled to the latching device 103 when the rear hook 34 is coupled to the coupling bracket 106a, as previously described.

The latching device 103 serves to couple the mounting end 33a with a predetermined coupling force. The latching device 103 is integrally formed to the support floor 102. The latching device 103 is provided with a pair of front and rear claw portions 103a. The front and rear claw portions 103a are coupled to the mounting end 33a in the vertical direction. In particular, as shown in FIG. 1(a), the mounting end 33a is confined by coupling with the claw portions 103a in the vertical direction while being inserted into the insertion-hole 102b. Such a confinement can be released by exerting an upward force, which is greater than a predetermined force (i.e., force greater than a load to elastically deform the claw portions 103a). Further, the mounting end 33a is restricted by the latching device 103 and the insertion-hole 102b within a predetermined displacement in the longitudinal and lateral directions of the vehicle body.

The vehicle body engagement element 50 having a hat shape (from a top view) is fixed to the hook 33 (via welding or the like) and extends toward the rear of the vehicle (observable from the lateral cross-section of the seat cushion) beyond the position of the mounting end 33a. Moreover, the vehicle body engagement element 50 is bent in the vertical direction so as to form a slide shape when laterally observed in FIG. 1(a). The vehicle body engagement element 50 is configured to form a pivot portion 50a that defines a pivot axis extending in the lateral direction of the vehicle. The pivot portion 50a is disposed towards the rear of the vehicle and closer to a top surface 102a of the support floor 102 compared to the other portions of the vehicle body engagement element 50.

The pivot portion 50a of the vehicle body engagement element 50 is disposed to contact the top surface 102a of the support floor 102 when a load is applied in the direction of lifting the front end of the seat cushion 10. In particular, the pivot portion 50a is disposed further at the rear of the vehicle than the mounting end 33a from an overlapped position of the pivot portion 50a and the mounting end 32a in the longitudinal direction of the vehicle. Also the pivot portion 50a is spaced apart upwardly of the vehicle from the top surface 102a of the support floor 102.

The gap between the pivot portion 50a and the top surface 102a in the vertical direction is limited within the range between heights h1 and h2, as shown in FIG. 1(a). Since the pivot portion 50a is disposed above the area between the top surface 102a and the height h1, the pivot portion 50a does not contact the top surface 102a, even if the seat cushion frame 30 becomes bent in the vertical direction due to a vehicle vibration, a passenger load, etc. When the pivot portion 50a is disposed in the area between the heights h1 and h2, the pivot portion 50a will reliably contact the top surface 102a at an early stage of the removal of the seat cushion 10, as explained below.

The operation of the first embodiment of the present invention will be described below.

In order to remove the seat cushion 10 from the rear floor panel 101, the mounting ends 33a of the front hooks 33 of the seat cushion frame 30 should be released from the claw portions 103a of the pinches 103 while the front end of the seat cushion 10 is lifted upward. Then, the engagement between the rear hook 34 and the coupling bracket 106 is released by sliding the seat cushion 10 toward the front of the vehicle.

More specifically, when a load is applied to lift and release the front end of the seat cushion 10, the mounting ends 33a can be lifted to release the engagement of the front hooks 33 from the pinches 103 by a moment. If the seat cushion frame 30 has a high strength, then the center of the rotation is located rearward of the vehicle body engagement elements 50. However, if the seat cushion frame 30 has a low strength and a rotational deformation of the seat cushion frame 30 occurs around the front hooks 33, then the pivot portions 50a of the vehicle body engagement elements 50 are rotated downward to contact the top surface 102a of the support floor 102. When the pivot portion 50a contacts the top surface 102a of the support floor 102, a moment around the pivot portion 50a is applied to the seat cushion frame 30. The moment also functions as an upward load to the front hook 33, which is positioned closer to the front of the vehicle than the pivot portion 50a. Further, since the mounting end 33a is placed between the front end of the seat cushion 10 (to which the load for release is applied) and the pivot portion 50a (serving as the center of the rotation), a leverage ratio is relatively higher and the mounting end 33a can be easily released from the latching device 103.

As explained above, in the vehicle seat 1 of the first embodiment of the present invention, although the seat cushion frame 30 may become elastically deformed due to the low strength of the seat cushion frame 30 during removal of the seat cushion 10, a load is applied to the mounting ends 33a to release the mounting ends 33a of the front hooks 33 from the pinches 103, while the pivot portions 50a serves as a support for the load. Accordingly, the seat cushion 10 can be removed from the vehicle body without increasing the strength of the seat cushion frame 30.

Since such an effect is provided by simply adding the vehicle body engagement elements 50 to the seat cushion frame 30, the present invention can be cost-efficient and lightweight (as opposed to improving the strength of the entire seat cushion frame 30).

Further, since the vehicle body engagement elements 50 are simply added to the conventional parts, the present invention can be applied to various types of vehicles. Also, the present invention does not require any change in the molds of the conventional parts, thereby saving costs associated with vehicle components and molds.

In addition, since the pivot portions 50a are positioned beyond the height h1 from the top surface 102a of the support floor 102, the noise resulting from contacting the pivot portions 50a and the top surface 102a can be prevented even if the seat cushion frame 30 is bent in the vertical direction by the vibration of the vehicle, passenger load, etc. Moreover, since the distance from the top surface 102a to pivot portions 50a is shorter than the height h2, the pivot portions 50a can serve as the supporting point at an early stage during the deformation of the seat cushion frame 30, as described above.

Second Embodiment

Figure 4A:
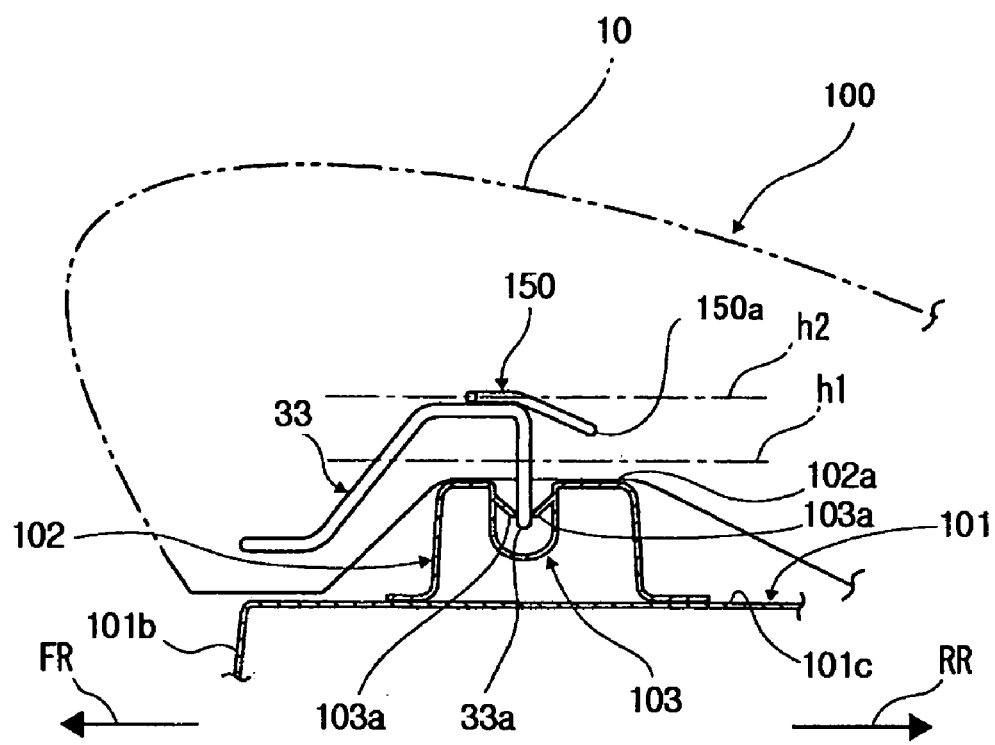
FIG. 4(a) is a simplified schematic side view of a vehicle seat constructed in accordance with a second embodiment of the present invention.
Figure 4B:
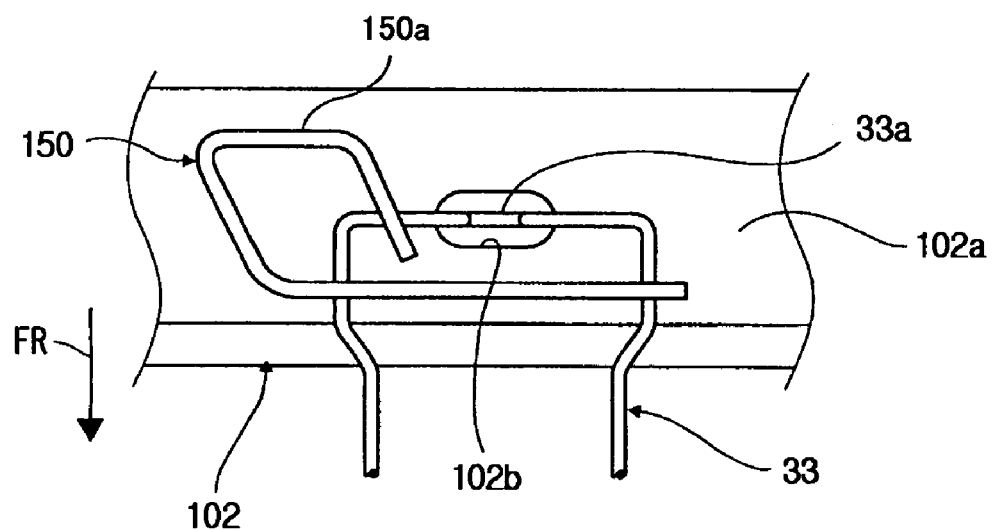
FIG. 4(b) is a partial top plan view of the vehicle seat shown in FIG. 4(a)

Referring now to FIGS. 4(a) and 4(b), a vehicle seat 100 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the seat cushion frame 30 of the vehicle seat 100 is provided with a pair of vehicle body engagement elements 150 with each having a pivot portion 150a that is horizontally aligned. The vehicle body engagement elements 150 replace the vehicle body engagement elements 50 of FIG. 2. The vehicle body engagement elements 150 have a different shape from that of the first embodiment, as shown in FIGS. 4(a) and 4(b). Specifically, the pivot portion 150a is configured to be offset from the mounting end 33a in the lateral direction of the vehicle.

Further, the second embodiment is substantially identical to the first embodiment in that: the vehicle body engagement element 150 is bent at its middle portion along the longitudinal direction of the vehicle; the pivot portion 150a is positioned closer to the top surface 102a of the support floor 102 than the other portions of the vehicle body engagement element 150; and the pivot portion 150a is located closer to the rear of the vehicle than the mounting end 33a and is spaced upwardly away from the top surface 102a of the support floor 102.

Therefore, the vehicle seat 100 of the second embodiment also provides the following effects: a releasing performance may be improved without increasing the strength of the seat cushion frame 30; such an improvement can be achieved with low cost and lightweight; it may be applicable to various types of vehicles; and the pivot portion can function as a supporting point at an early stage of removing the seat cushion without generating any noise.

Third Embodiment

Figure 5A:
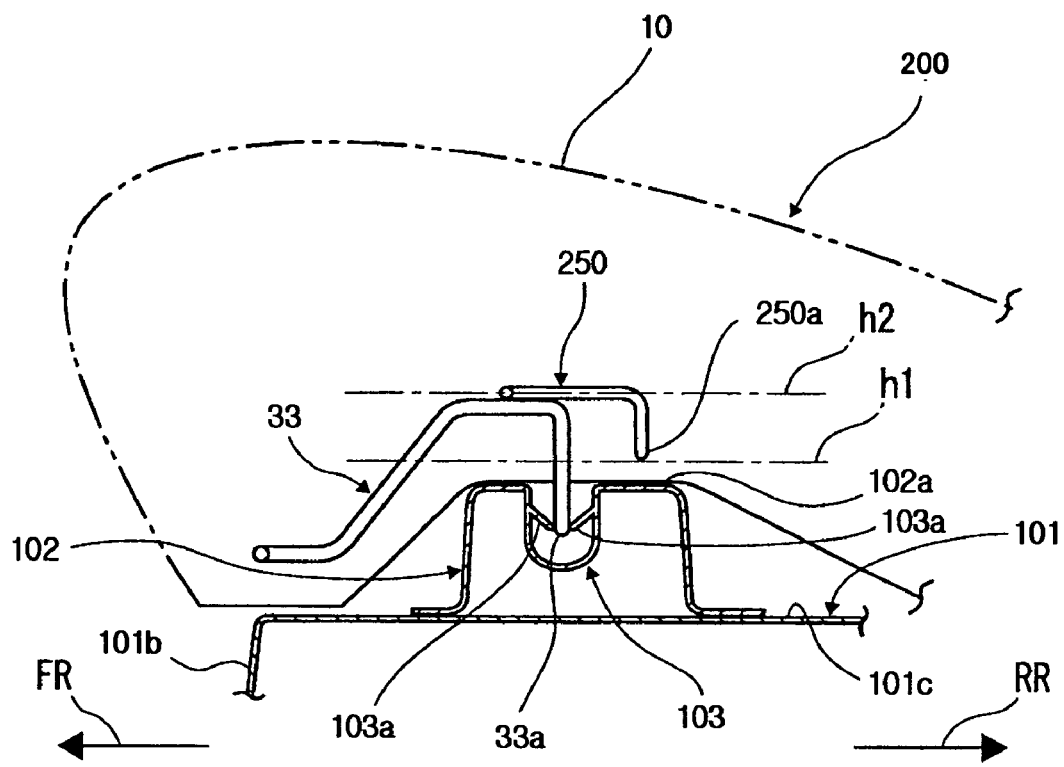
FIG. 5(a) is a side view of a vehicle seat constructed in accordance with a third embodiment of the present invention.
Figure 5B:
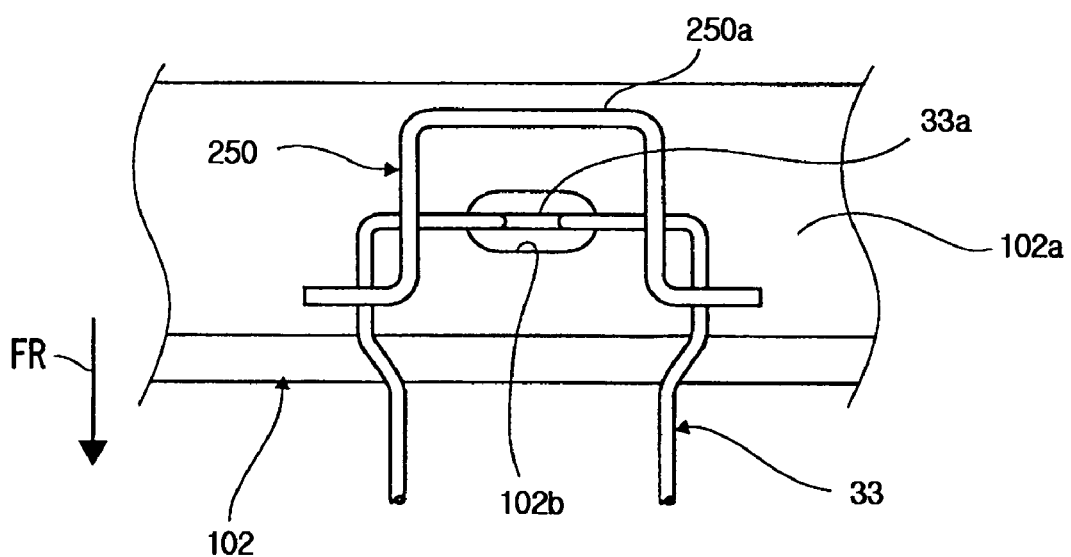
FIG. 5(b) is a partial top plan view of the vehicle seat shown in FIG. 5(a)

Referring to FIGS. 5(a) and 5(b), a vehicle seat 200 constructed in accordance with the third embodiment of the present invention will be described. In view of the similarity between the third embodiment and prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

The vehicle seat 200 of the third embodiment is provided with a pair of vehicle body engagement elements 250, which have a different shape from that of the first embodiment. Specifically, the vehicle body engagement element 250 is bent so as to have a substantially L-shape when observing from a side view. A pivot portion 250a of vehicle body engagement element 250 is positioned extremely close to height h1 without contacting the top surface 102a of the support floor 102 even if the seat cushion frame 30 is bent in the vertical direction by the vibration of the vehicle, passenger load, etc. Other features of the third embodiment are substantially identical to those of the first embodiment.

According to the vehicle seat 200 of the third embodiment, when the front end of the seat cushion 10 is lifted for release, the pivot portions 250a can quickly contact the top surface 102a of the support floor 102 so as to release the mounting ends 33a from the latching devices 103.

Similar to the first embodiment, the vehicle seat 200 of the third embodiment provides the following effects: a releasing performance may be improved without increasing the strength of the seat cushion frame 30; such an improvement can be achieved with low cost and lightweight; it may be applicable to various types of vehicles; and the pivot portion can function as a supporting point at an early stage of removing the seat cushion without generating any noise.

Fourth Embodiment

Figure 6A:
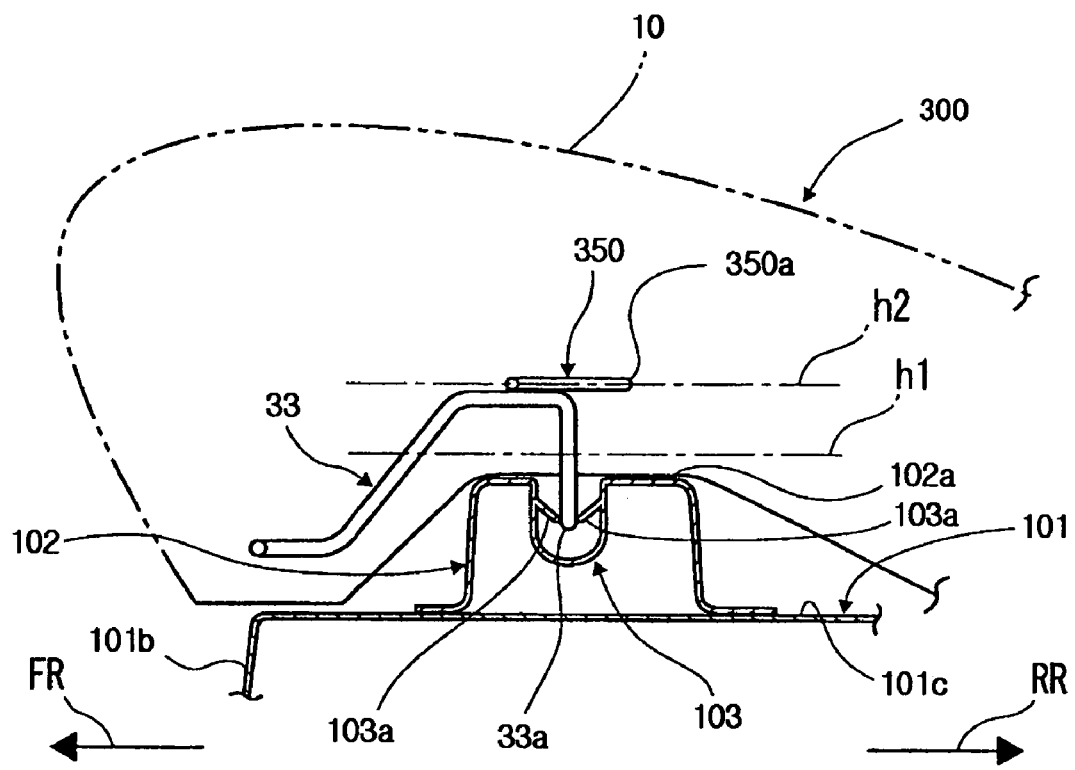
FIG. 6(a) is a simplified schematic view of a vehicle seat constructed in accordance with a fourth embodiment of the present invention.
Figure 6B:
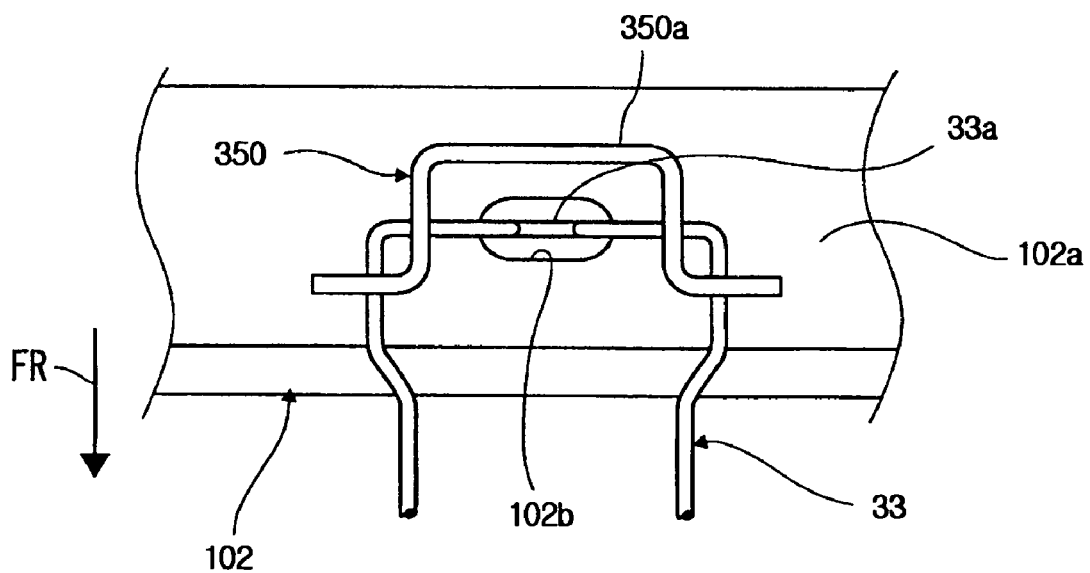
FIG. 6(b) is a partial top plan view of the vehicle seat shown in FIG. 6(a)

Referring to FIGS. 6(a) and 6(b), a vehicle seat 300 constructed in accordance with the fourth embodiment of the present invention will be described. In view of the similarity between the fourth embodiment and prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

The vehicle seat 300 of the fourth embodiment is provided with a pair of vehicle body engagement elements 350, which have a different shape from that of the first embodiment. Specifically, the vehicle body engagement element 350 is not bent in the vertical direction, but is rather substantially straight when observing from a side view. A pivot portion 350a of the vehicle body engagement element 350 is positioned at the same height as the other portion of the vehicle body engagement element 350, i.e., at the uppermost height of height h2 in which the pivot portion functions as a supporting point at an early stage of removing the seat cushion 10. Other features of the fourth embodiment are substantially identical to those of the first embodiment.

According to the vehicle seat 300 of the fourth embodiment, the noise resulting from contacting the pivot portions 350a and the top surface 102a of the support floor 102 can be prevented. In addition, the releasing performance can be improved by contacting the pivot portions 350a with the pivot floor 102 when removing the seat cushion 10.

Similar to the first embodiment, the vehicle seat 300 of the fourth embodiment also provides the following effects: the releasing performance may be improved without increasing the strength of the seat cushion frame 30; such an improvement can be achieved with low cost and lightweight; it may be applicable to various types of vehicles; and the pivot portion can function as a supporting point at an early stage of removing the seat cushion without generating any noise.

Fifth Embodiment

Figure 7A:
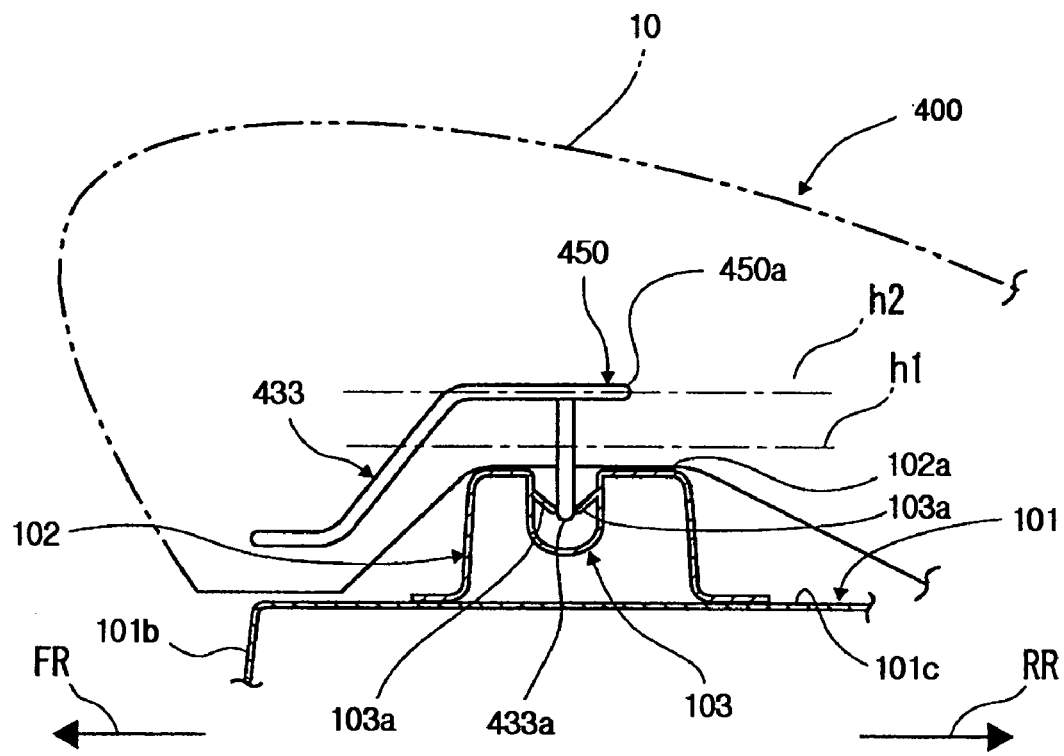
FIG. 7(a) is a simplified schematic view of a vehicle seat constructed in accordance with a fifth embodiment of the present invention.
Figure 7B:
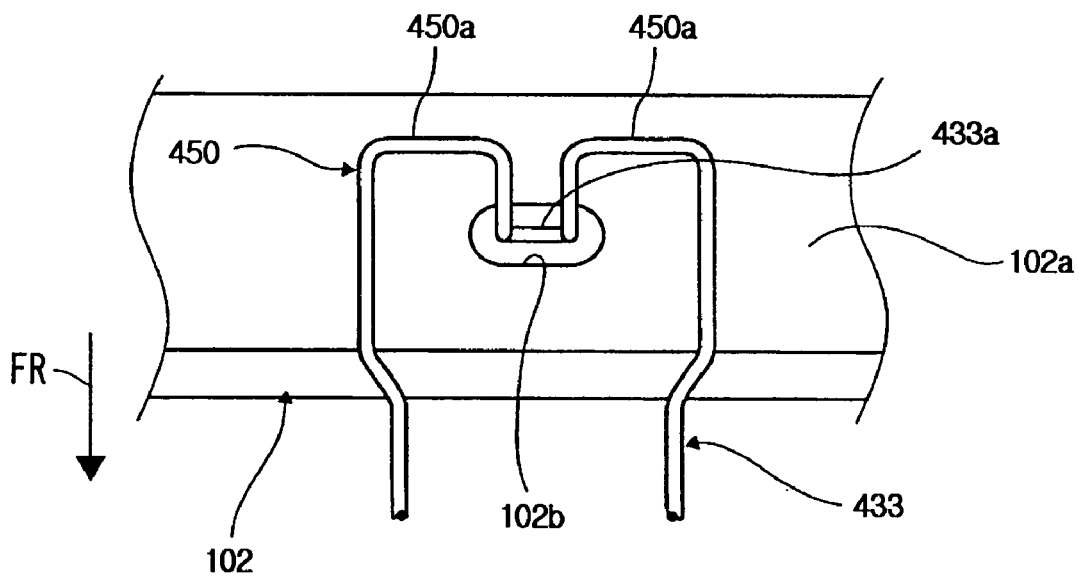
FIG. 7(b) is a partial top plan view of the vehicle seat shown in FIG. 7(a)

Referring to FIGS. 7(a) and 7(b), a vehicle seat 400 constructed in accordance with the fifth embodiment of the present invention will be described. In view of the similarity between the fifth embodiment and prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

In the vehicle seat 400 of the fifth embodiment, an annular frame is provide that is identical to the annular frame 30 except for a pair of front hooks 433 replace the front hooks 33 such that a vehicle body engagement element 450 is integrally formed as a part of a respective one of the front hooks 433. Each of the vehicle body engagement elements 450 has a pivot portion 450a serving as a supporting point is integrally formed to the front hook 433. Specifically, the vehicle body engagement element 450 is provided as a rear extension of the front hook 433 so as to extend more toward the rear of the vehicle as compared to a mounting end 433a. The mounting end 433a is curved at the lateral middle portion of the vehicle body engagement element 450 toward the front of the vehicle and extends downward (similar to the first embodiment). In a rear portion of the vehicle body engagement element 450, the pivot portion 450a extends in the lateral direction of the vehicle at the position slightly below the height h2.

According to the vehicle seat 400 of the fifth embodiment, when the front end of the seat cushion 10 is lifted to release the seat cushion 10, the front hooks 433 are rotated around the mounting ends 433a. By such a rotation, the pivot portions 450a contacts the top surface 102a of the support floor 102 in order to lift the mounting ends 433a upwardly as well as to release the coupling of the latching devices 103.

Similar to the first embodiment, the vehicle seat 400 of the fifth embodiment also provides the following effects: a releasing performance may be improved without increasing the strength of the seat cushion frame 30; such an improvement can be achieved with low cost and lightweight; and the pivot portion can function as a supporting point at an early stage of removing the seat cushion without generating any noise.

Further, since the pivot portion 450a is integrally formed to the front hook 433 in the vehicle seat 400 of the fifth embodiment, the number of components can be decreased so as to reduce the manufacturing costs and the weight of the vehicle seat.

Sixth Embodiment

Figure 8A:
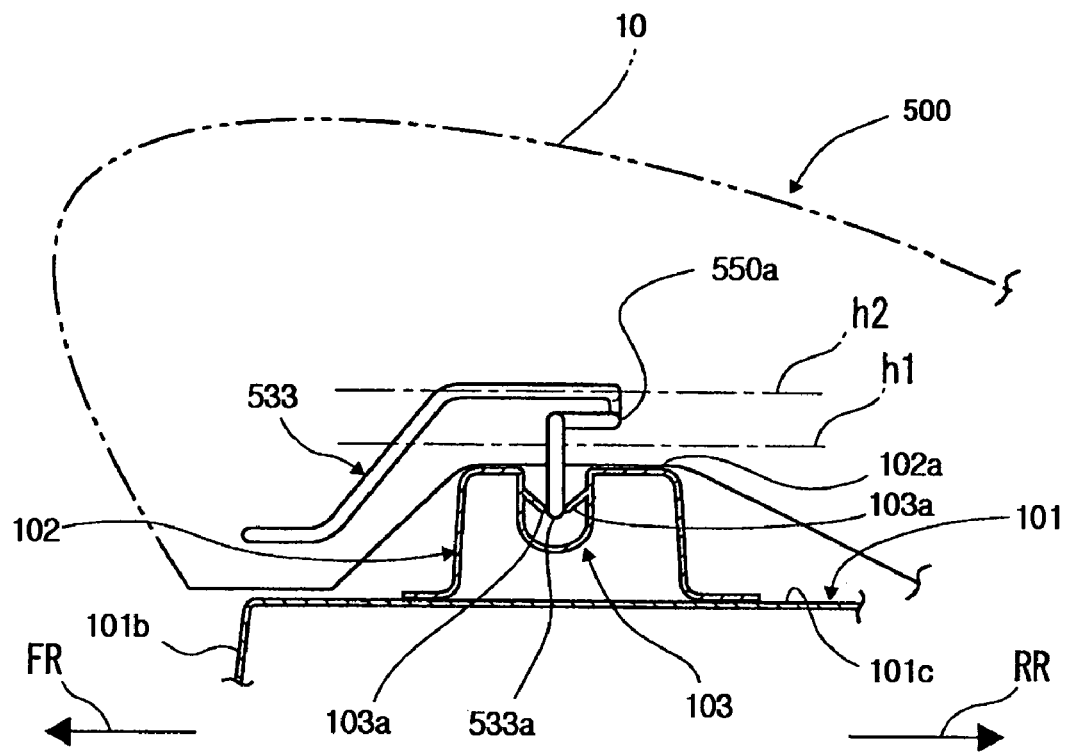
FIG. 8(a) is a simplified schematic view of a vehicle seat constructed in accordance with a sixth embodiment of the present invention.
Figure 8B:
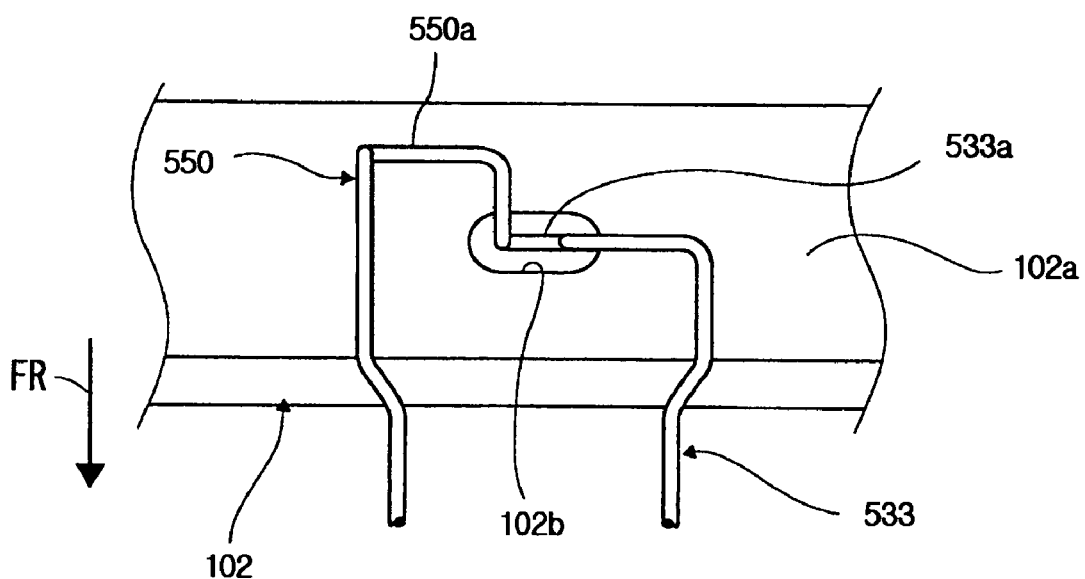
FIG. 8(b) is a partial top plan view of the vehicle seat shown in FIG. 8(a)

Referring to FIGS. 8(a) and 8(b), a vehicle seat 500 of the sixth embodiment of the present invention will be described. In view of the similarity between the sixth embodiment and prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

In the vehicle seat 500 of the sixth embodiment, an annular frame is provide that is identical to the annular frame 30, except for a pair of front hooks 533 replace the front hooks 33 such that a vehicle body engagement element 550 is integrally formed as a part of a respective one of the front hooks 533. Each of the vehicle body engagement elements 550 has a pivot portion 550a serving as a load transferring or pivoting load point is integrally formed to the front hook 533 (similar to the fifth embodiment). The shape of the front hook 533 is different from that of the fifth embodiment.

As shown in FIG. 8(b), the vehicle body engagement element 550 is a rear extension of the front hook 533 that is formed only at the right side (left side in the drawing) from the mounting end 533a. The pivot portion 550a is formed at a position curved downwardly from a rear end of the vehicle body engagement element 550. The position of the pivot portion 550a is lower than that of the pivot portion 450a of the fifth embodiment.

According to the vehicle seat 500 of the sixth embodiment, when the front end of the seat cushion 10 is lifted to release the seat cushion 10, the front hooks 533 are rotated around the mounting ends 533a. By such a rotation, the pivot portions 550a contact the top surface 102a of the support floor 102 (earlier than the fifth embodiment) in order to lift the mounting ends 533a upward as well as to release the coupling with the latching devices 103.

Similar to the first embodiment, the vehicle seat 500 of the sixth embodiment also provides the following effects: a releasing performance may be improved without increasing the strength of the seat cushion frame 30; such an improvement can be achieved with low cost and lightweight; and the pivot portion can function as a supporting point at an early stage of removing the seat cushion without generating any noise.

Further, since the pivot portion 550a is integrally formed to the front hook 533 in the vehicle seat 500 of the sixth embodiment, the number of components can be decreased to reduce the manufacturing costs and the weight of the vehicle seat (similar to the fifth embodiment).

Seventh Embodiment

Figure 9A:
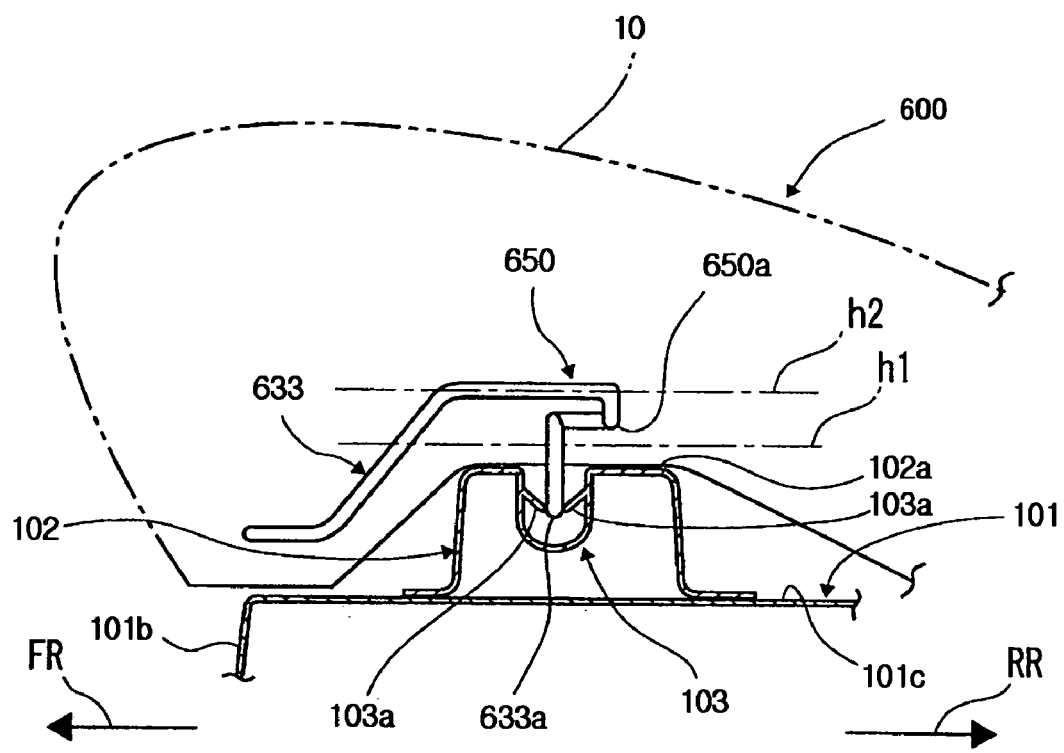
FIG. 9(a) is a simplified schematic view of a vehicle seat constructed in accordance with a seventh embodiment of the present invention.
Figure 9B:
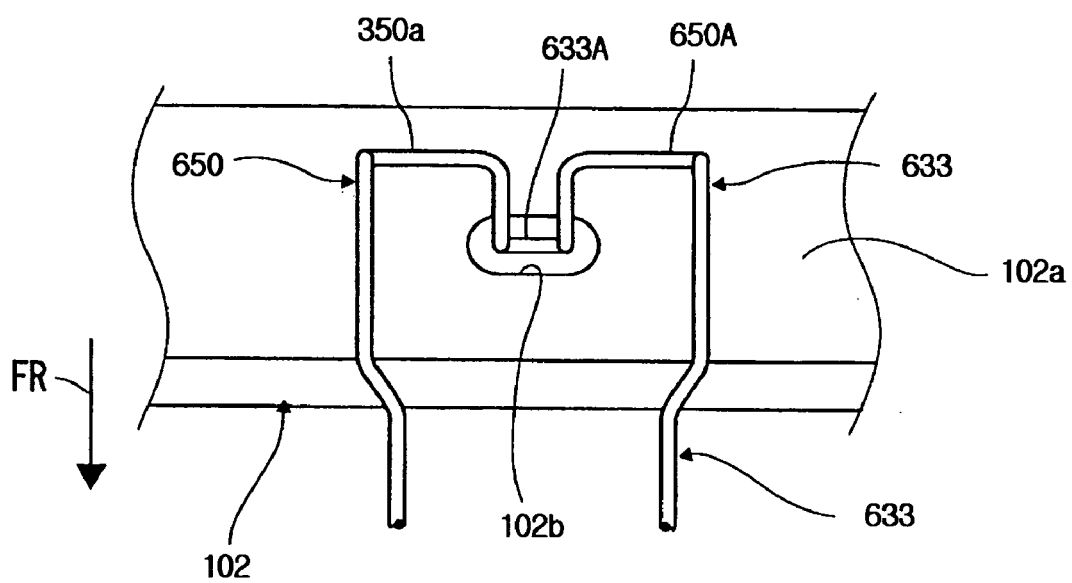
FIG. 9(b) is a partial top plan view of the vehicle seat shown in FIG. 9(a)

Referring to FIGS. 9(a) and 9(b), a vehicle seat 600 constructed in accordance with a seventh embodiment of the present invention will be described. In view of the similarity between the seventh embodiment and prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

In the vehicle seat 600 of the seventh embodiment, an annular frame is provide that is identical to the annular frame 30 except for a pair of front hooks 633 replace the front hooks 33 such that a vehicle body engagement element 650 is integrally formed as a part of a respective one of the front hooks 633. Each of the vehicle body engagement elements 650 has a pivot portion 650A serving as the load transferring point that is integrally formed to the front hook 633 (similar to the fifth embodiment). The shape of the front hook 633 of the seventh embodiment is different from that of the fifth embodiment.

As shown in FIG. 9(b), each of the vehicle body engagement elements 650 has a pair of rear extensions at both sides of the mounting end 633A in the lateral direction of the vehicle. The pivot portion 650A is formed at a position curved downwardly from the rear ends of the rear extensions of the vehicle body engagement elements 650.

According to the vehicle seat 600 of the seventh embodiment, when the pivot portions 650a contact the top surface 102a of the support floor 102 when releasing the seat cushion 10, the mounting ends 633a are lifted upward to release the coupling of the latching device 103. The contacting timing of the pivot portion 650a of the seventh embodiment is as early as that of the sixth embodiment, and the coupling can be reliably released at an early stage since the pivot portions 650a contact both sides of the mounting ends 633a.

Eighth Embodiment

Figure 10A:
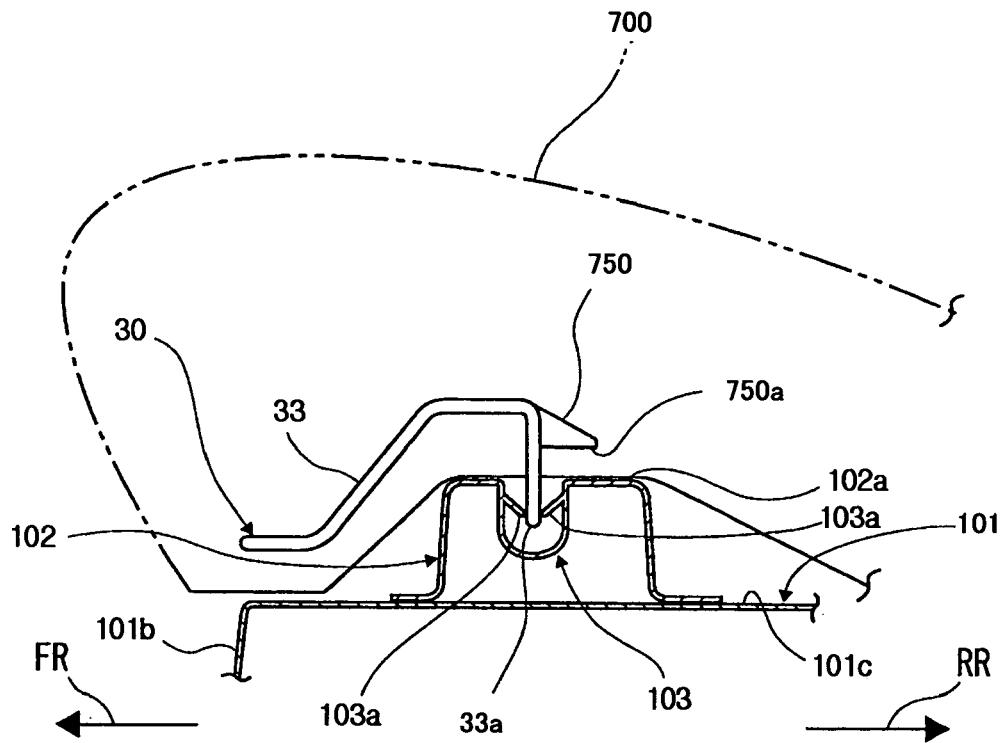
FIG. 10(a) is a simplified schematic view of a vehicle seat constructed in accordance with an eighth embodiment of the present invention.
Figure 10B:
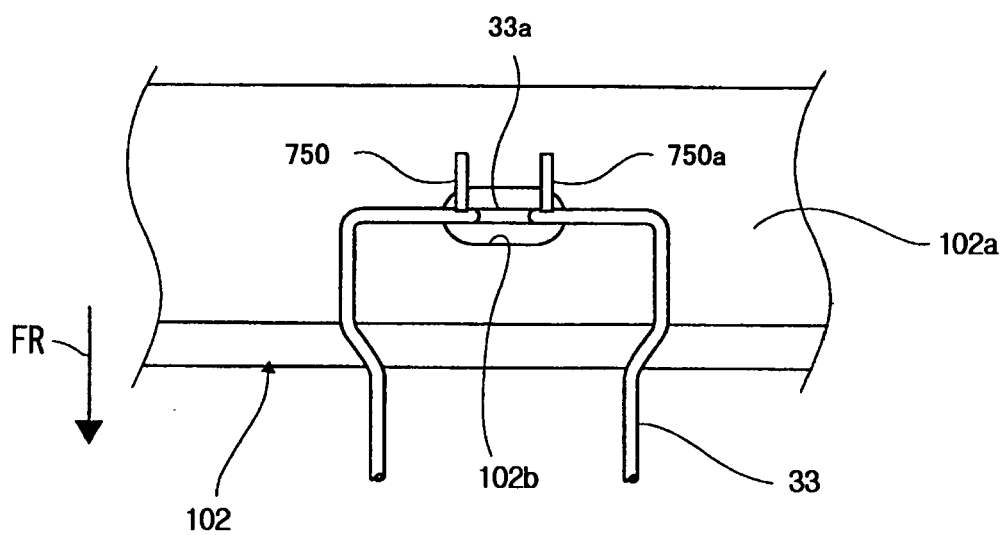
FIG. 10(b) is a partial top plan view of the vehicle seat shown in FIG. 10(a)

Referring to FIGS. 10(a) and 10(b), a vehicle seat 700 constructed in accordance with an eighth embodiment of the present invention will be described. In view of the similarity between the eighth embodiment and prior embodiments, the parts of the eighth embodiment that are identical to the parts of the prior embodiments will be given the same reference numerals as the parts of the prior embodiments. Moreover, the descriptions of the parts of the eighth embodiment that are identical to the parts of the prior embodiments may be omitted for the sake of brevity.

In this the eighth embodiment, the annular frame 30 has vehicle body engagement elements or plates 750 that replace the vehicle body engagement elements 50 of the first embodiment. Each of the vehicle body engagement elements 750 has a pivot portion 750A serving as the load transferring point. The vehicle body engagement elements or plates 750 are made from metal sheet, as shown in FIGS. 10(a) and 10(b). The vehicle body engagement elements or plates 750 are not limited to the shape shown in FIGS. 10(a) and 10(b).

While the seat cushion is removed from the vehicle body after releasing the coupling of the seat cushion in the first to eighth embodiments, the present invention is not limited to the above. For example, the seat cushion may be lifted to vertical after access position releasing the coupling of the seat cushion 10 and the vehicle body.

Ninth Embodiment

Figure 11:
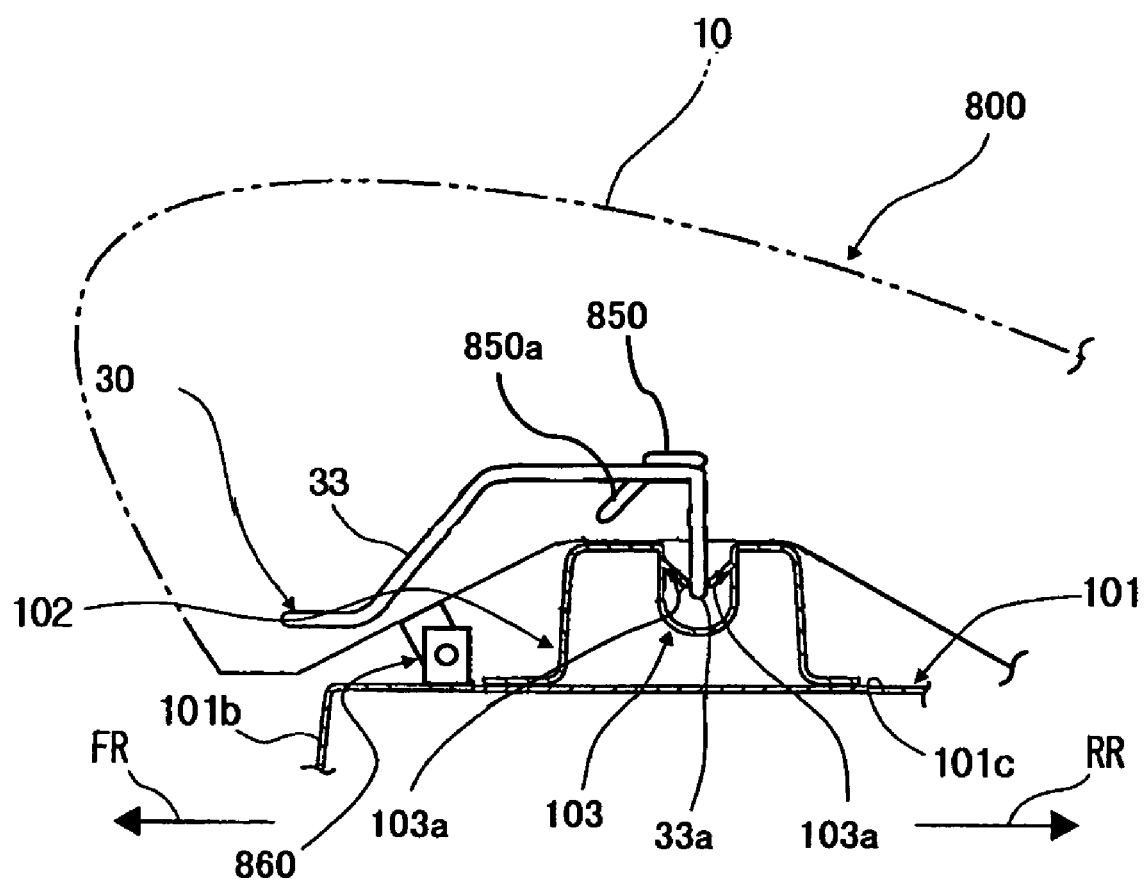
FIG. 11 is a simplified schematic view of a vehicle seat constructed in accordance with a ninth embodiment of the present invention.

Referring to FIG. 11, a vehicle seat 800 constructed in accordance with a ninth embodiment of the present invention will be described. In view of the similarity between the ninth embodiment and prior embodiments, the parts of the ninth embodiment that are identical to the parts of the prior embodiments will be given the same reference numerals as the parts of the prior embodiments. Moreover, the descriptions of the parts of the ninth embodiment that are identical to the parts of the prior embodiments may be omitted for the sake of brevity.

In the vehicle seat 800 of the ninth embodiment, the front hooks 833 each has a vehicle body engagement element 850 attached thereto. Each of the vehicle body engagement elements 850 has a pivot portion 850a serving as the load transferring point. Also, the seat cushion 10 is pivotally coupled at the front end to the vehicle body to form a pop up seat cushion. The vehicle body engagement element 850 is spaced forward of the front hooks 33 towards a front end of the seat cushions. According to the vehicle seat 800 of the ninth embodiment, when the rear end of the seat cushion 10 is lifted to move the seat cushion 10 to an access position, the front hooks 33 are rotated around the mounting ends 33a. By such a rotation, the pivot portions 850a contact the top surface 102a of the support floor 102 in order to lift the mounting ends 33a upward as well as to release the coupling with the latching devices 103.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Also for example, while the above embodiment of the present invention are described to be vehicle seats used as rear seats of the passenger car, the present invention is not limited to the above and may be used as front seats or applied to vehicles other than the passenger car. While the above embodiments of the present invention are provided with the seat cushion extending in the lateral direction of the vehicle, the seat cushion may extend in other directions such as the longitudinal direction of the vehicle. While the above embodiments of the present invention are provided with the pivot portion (e.g., pivot portion 50a), which is spaced apart from the support floor 102 in the vehicle body, the pivot portion may contact the vehicle body. In such a case, it is preferred to provide a cushion between the pivot portion and the support floor 102 to prevent any noise from being generated. While the pivot portion contacts the support floor 102 in the above embodiments of the present invention, the pivot portion may contact other portions of the vehicle body such as the rear floor panel 101. While the latching device 103 of the above embodiments comprises the hook portion coupled to the claw portion 103a, such coupling means is not limited to those of the above embodiments. For example, a coupling means that can be coupled by a predetermined coupling force (e.g., screw, latch, etc.) may be provided. Thus, the foregoing descriptions of the embodiments according to the present invention are provided for illustration only, and not for the purpose of limiting the invention as defined by the appended claims and their equivalents.

What is claimed is:

1. A vehicle seat comprising:
   a seat cushion having an upper seat surface;
   an annular frame disposed within the seat cushion to maintain a shape of the seat cushion;
   a striking member extending from the annular frame in an opposing direction to the upper seat surface of the seat cushion to releasably engage a latching device mounted to a vehicle body; and
   a vehicle body engagement element attached to the annular frame with the vehicle body engagement element being located extending away from the striking member to serve as a load transferring point at which the vehicle body engagement element transfers a bending load of the annular frame to the vehicle body as the vehicle seat is being initially lifted.

2. The vehicle seat according to claim 1, wherein
   the annular frame has a pair of side frame sections, a front frame section extending laterally between front ends of the side frame sections and a rear frame section extending laterally between rear ends of the side frame sections; and
   the vehicle body engagement element includes a pivot portion arranged relative to the striking member to selectively contact the vehicle body, with a front to rear distance from the striking member to one of the front and rear frame sections of the annular frame being shorter than a front to rear distance from the pivot portion to the one of the front and rear frame sections of the annular frame.

3. The vehicle seat according to claim 1, wherein
   the vehicle body engagement is configured and arranged relative to the striking member such that the vehicle body engagement element is vertically spaced apart from the vehicle body when the striking member is engaged with latching device of the vehicle body.

4. The vehicle seat according to claim 1, wherein
   the vehicle body engagement element is disposed within the seat cushion so as to be closer to the vehicle body than the upper seat surface of the seat cushion when the striking member is engaged with the latching device of the vehicle body.

5. The vehicle seat according to claim 1, wherein
   the vehicle body engagement element is integrally formed as a unitary part of the annular frame.

6. The vehicle seat according to claim 1, wherein
   the vehicle body engagement element is a separate part that is fixed to the annular frame.

7. The vehicle seat according to claim 1, wherein the vehicle body engagement element is integrally formed with the striking member.

8. The vehicle seat according to claim 1, wherein
   the vehicle body engagement element has a substantially uniform cross-sectional profile.

9. The vehicle seat according to claim 1, wherein
the vehicle body engagement element is configured and arranged relative to the striking member such that the vehicle body engagement element contacts the vehicle body when the striking member is removed from the latching device of the vehicle body.

10. The vehicle seat according to claim 1, wherein
the annular frame includes a sub-frame connected to right and left side sections of the annular frame, and the striking member is attached to the sub-frame.

11. The vehicle seat according to claim 1, wherein
the vehicle body engagement element is disposed proximately about a straight line formed by connecting the striking member and a front end of the seat cushion.

12. The vehicle seat according to claim 1, further comprising
an additional vehicle body engagement element attached to the annular frame with the vehicle body engagement element such that the vehicle body engagement elements are laterally spaced apart long the annular frame.

13. The vehicle seat according to claim 1, wherein
the vehicle body engagement element is spaced rearward of the striking member towards a rear end of the seat cushion.

14. The vehicle seat according to claim 1, wherein
the vehicle body engagement element is spaced forward of the striking member towards a front end of the seat cushion.

15. A vehicle seat comprising:
seat cushioning means for providing vehicle seating with an upper seat surface;
seat frame supporting means for annularly supporting the seat cushioning means to maintain a shape of the seat cushioning means;
seat securing means for releasably coupling the seat frame supporting means to a vehicle body; and
vehicle body engagement means for selectively contacting the vehicle body to serve as a load transferring point at which the vehicle body engagement means transfers a bending load of the annular frame to the vehicle body as the vehicle seat is being initially lifted.

16. A vehicle seat removal method comprising:
providing a vehicle seat having an annular frame disposed within a seat cushion to maintain a shape of the seat cushion, with an attachment member of the annular frame being attached to a latching device of a vehicle body structure;
initially lifting the vehicle seat such that a vehicle body engagement element of the annular frame contacts the vehicle body structure to serve as a pivot point at which the vehicle body engagement element transfers a load to the annular frame as the vehicle seat is initially lifted; and
additionally lifting the vehicle seat such that the striking member disengages from the latching device.

17. The vehicle seat according to claim 1, wherein
the striking member extends outward from a bottom seat surface of the seat cushion to an external environment with respect to the seat cushion.

18. The vehicle seat according to claim 1, wherein
the striking member is fixedly connected within the seat cushion to the engagement element.

19. The vehicle seat according to claim 15, wherein
the seat securing means extends outward from a bottom seat surface of the seat cushioning means to an external environment with respect to the seat cushioning means.

20. The vehicle seat according to claim 15, wherein
the seat securing means is fixedly connected within the seat cushioning means to the engagement means.

* * * * *